United States Patent Office 2,755,141
Patented July 17, 1956

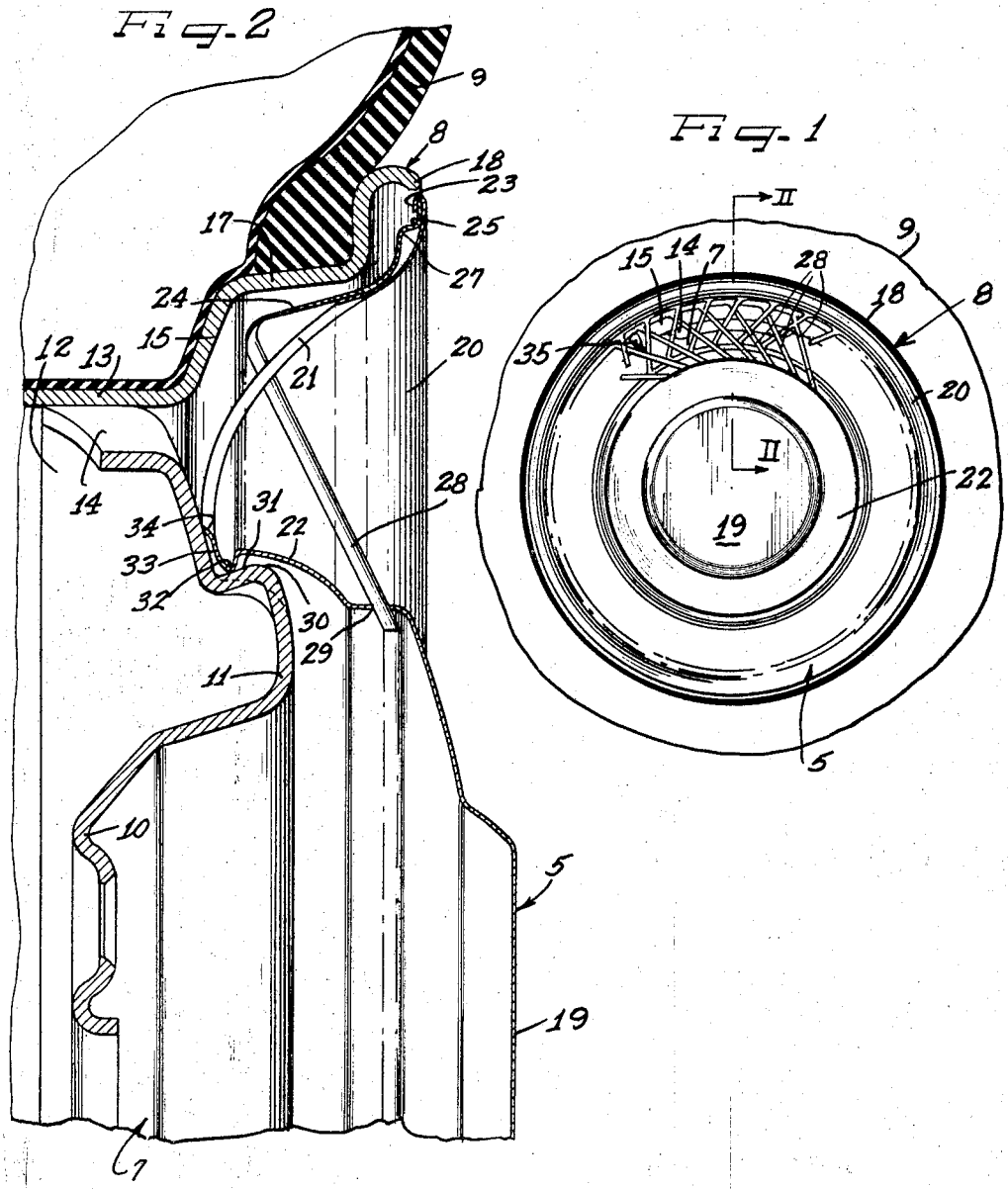

2,755,141

WHEEL COVER

George Albert Lyon, Detroit, Mich.

Application June 10, 1954, Serial No. 435,723

11 Claims. (Cl. 301—37)

The present invention relates to improvements in wheel structures and more particularly concerns the ornamental and protective covering of the outer sides of vehicle wheels.

An important object of the present invention is to provide an improved wheel structure having a novel spoke-simulating cover thereon.

Another object of the invention is to provide a novel wheel structure wherein a spoke-simulating wheel cover is applied in snap-on pry-off relation to retaining bumps on a vehicle wheel.

A further object of the invention is to provide an improved wheel structure wherein spoke-simulating elements of a cover assist in tensioning a cover-retaining part of a cover in association with cover-retaining bumps on a wheel.

Still another object of the invention is to provide an improved spoke-wheel simulating cover for disposition at the outer side of a vehicle wheel having retaining bumps thereon with which a portion of the cover cooperates retainingly assisted by certain of the spoke-simulating elements.

Yet another object of the invention is to provide an improved spoke-simulating wheel cover for disposition at the outer side of a vehicle wheel having retaining bumps thereon.

Other objects, features and advantages of the present invention will be readily apparent from the following detailed description of a preferred embodiment thereof taken in conjunction with the accompanying drawing in which:

Figure 1 is a side elevational view of a vehicle wheel structure embodying features of the invention; and Figure 2 is a fragmentary enlarged radial sectional view taken substantially on the line II—II of Figure 1.

A spoke-simulating cover 5 is adapted to be applied to the outer side of a vehicle wheel comprising a disk spider body 7 and a drop center multi-flange tire rim 8 which supports a pneumatic tire and tube assembly 9.

The wheel body 7 comprises a dished central bolt-on flange 10 encircled by an axially outwardly projecting annular reinforcing nose bulge 11 formed intermediately of the wheel body. At its outer margin the wheel body is provided with a generally axially inwardly directed attachment flange 12 secured in suitable fashion to a base flange 13 of the tire rim. At suitable intervals such as 3 or 4, the attachment flange 12 is inset to provide openings 14 through the wheel for circulation of air therethrough.

From the base flange 13 the tire rim has extending generally radially outwardly a side flange 15 which merges with a generally axially outwardly and radially outwardly sloping intermediate flange 17 from which extends a generally radially outwardly and then axially outwardly turned terminal flange 18.

Herein the wheel cover 5 is dimensioned to substantially completely cover the outer side of the wheel body 7 and the tire rim 8 and comprises a central crown portion 19 for substantially covering the wheel body and more particularly the bolt-on flange 10 and the reinforcing nose bulge 11, while an outer annular portion 20 of the cover is provided for overlying the tire rim. By preference, the crown portion 19 and the outer annular portion 20 are formed integrally in one piece from a sheet or plate of sheet metal such as stainless steel or brass or the like and appropriately finished. Integral connection of the crown and outer annular portions is effected by means of a uniform series of generally radially extending and peripherally angled spoke-simulating elements 21 extending from the edge of a side wall portion 22 of the crown of the cover and merging into the inner edge of the outer annular portion 20.

At its outer margin the annular cover portion 20 is turned under to provide a finishing and reinforcing edge bead flange 23 which in the present instance is utilized for securing in place a cover-reinforcing and spoke-carrying ring member 24. This member extends generally axially and radially inwardly and is dimensioned to lie in spaced relation generally telescopically within the intermediate flange 17 of the tire rim, with a generally radially outwardly angled outer marginal portion 25 clamped to the back of the outer marginal portion of the cover annulus 20 by the flange 23. Spaced a short distance radially inwardly from its marginal extremity, the flange 25 is provided with a generally axially inwardly directed annular reinforcing and pry-off rib 27 which overlies the radially extending portion of the terminal flange 18 in assembly and cooperates with the underturned marginal flange 23 of the cover to substantially reinforce the cover portion 20 for resistance to deformation upon the application of pry-off force to the laminated, multi-layer structure afforded by the annular cover portion 20 and the ring member 24.

At its inner edge the spoke-carrying and reinforcing member 24 is provided with a uniform series of generally radially inwardly extending integral spoke-simulating elements 28 which are preferably shaped in one piece with the ring member and are in the same number as the spoke-simulating elements 21 and angled in the opposite peripheral direction so that they may project through the spaces between the spoke elements 21 and extend in crossing relation to the spoke elements 21. At their distal extremities the spoke-simulating elements 28 are secured into respective apertures 29 in the axially outer portion of the crown member side walls 22. The appearance thus afforded by the wheel cover 5 is substantially similar to a wire spoke wheel of the kind considered desirable for the sportier models of automobiles, while nevertheless the wheel is of the much more economical disk spider construction.

For attachment of the cover 5 to the wheel, the expedient covered in my Patent No. 2,445,330, issued July 20, 1948 is preferably employed. To this end, the nose bulge 11 on the wheel body is provided with a series of circumferentially uniformly spaced cover-retaining bumps 30 which project generally radially outwardly from the radially outer side of the nose bulge and have generally radially outwardly facing and axially and radially inwardly sloping, generally undercut, oblique cover-retaining shoulders 31 engageable in retaining relation by a generally radially inwardly directed annular cover-retaining rib 32 provided at the axially inner end of the cover crown side wall 22. The inside diameter of the rib 32 is slightly less than the minimum diameter described about the retaining bump shoulders 31 so that in applying the cover 5 to the wheel, the retaining rib 32 must flex radially outwardly resiliently sufficiently to snap over the nose portions of the retaining bumps 30 onto the inwardly angled cam surfaces of the retaining bump shoulders 31. To facilitate such flexing, the material of the principal cover plate is selected to be of sufficiently thin, resilient stock, and in the working of the material to form the crown side wall flange 22 and the retaining rib 32 the resilience factor is enhanced.

Herein, the spoke elements 21 are utilized to cooperate with the retaining rib shoulder 32 of the cover for assisting in tensioning the retaining rib so as to maintain a thorough resilient retaining grip upon the retaining bump shoulders 31. To this end, the inner edge extremity of the side wall flange 22 terminates adjacent to the axially inner side of the retaining rib 32 in a generally radially outwardly extending narrow flange 33 from which the spoke simulating elements 21 extend. The extremity edge portion of the flange 33 is turned generally axially inwardly as indicated at 34 and the contiguous ends of the spoke elements 21 merge thereinto. For imparting resilience enabling slight resilient compression of the spoke elements 21, they are formed on a curve to bow generally axially inwardly from juncture with the flange 33. Thereby, as the retaining rib shoulder 32 is flexed radially outwardly in moving over the retaining bumps 30, the spoke elements 21 are adapted to flex resiliently while storing up tensioning energy which reacts generally radially inwardly toward the flange 33 and the retaining shoulder rib 32 for enhancing the resiliently tensioned grip of the rib with the shoulder of the retaining bumps.

Another feature resides in that as an incident to the axially inward camming action resulting from the resilient tension of the retaining shoulder rib 32 upon the shoulders 31 of the retaining bumps, the inwardly angled flange edge 34 and the generally axially inwardly directed edges defining the radially inner end portions of the spoke elements 21 are forced under substantial resilient compression against the contiguous surface of the wheel body. Since the shaping of the sheet metal in the forming and trimming dies is from the outer surface toward the inner side of the cover, any burrs or roughnesses at the edges engaging the wheel body will tend to dig or anchor thereagainst and thereby strongly resist turning of the cover on the wheel due to torque forces in service. This is a valuable feature in preventing distortion of a valve stem 35 that may project through one of the spaces defined between the crossing spoke elements as shown in Figure 1.

It will also be observed that since the substantial openings or spaces between the spoke elements in the wheel lie opposite the wheel openings 14, free circulation of air through the cover and the wheel is permitted.

Application of the cover to the outer side of the wheel is effected by generally locating the cover with respect to the outer side of the wheel and then pressing the same axially inwardly until a squared-up, centered attached relation is attained by cooperation of the retaining bumps 30 and the retaining rib 32. For removing the cover from the wheel, pry-off force is applied behind the outer annular portion 20 of the cover. During such pry-off, the inner end portions of the spoke elements 28 may move reciprocably in the respective openings 29 within which they are engaged, while the spoke elements 21 may flex and relieve the resilient inward pressure or tension upon the retaining rib 32, and as a matter of fact may reverse the tension or pressure by drawing generally radially outwardly on the flange 33 and the rib 32 and thus facilitate and ease sliding of the retaining rib free from the retaining bumps, and more particularly the retaining bump nearest to the application of pry-off force.

It will be understood that modifications and variations may be effected without departing from the scope of the novel concepts of the present invention.

I claim as my invention:

1. In a wheel structure including a tire rim and a wheel body having retaining bumps thereon, a cover for disposition at the outer side of the wheel having radially inner and outer portions for respectively overlying the wheel body and the tire rim and connected together by wire-wheel spoke-simulating elements, the radially inner of said cover portions having cover-retaining shoulder means thereon for snap-on pryoff cooperation with the retaining bumps, certain of said spoke-simulating elements being bowed in an axial direction of the cover and resiliently flexible and cooperating with said shoulder means by resiliently thrusting endwise toward the same for improving the grip of the shoulder means upon the retaining bumps.

2. In a wheel structure including a tire rim and a wheel body having retaining bumps thereon, a cover for disposition at the outer side of the wheel having radially inner and outer portions for respectively overlying the wheel body and the tire rim and connected together by wire-wheel spoke-simulating elements, the radially inner of said cover portions having cover-retaining shoulder means thereon for snap-on pry-off cooperation with the retaining bumps, and means cooperatively related to said retaining rib and said spokes for coaction with the wheel body spaced from said bumps to retain the cover against turning on the wheel.

3. In a wheel structure including a tire rim and a wheel body having radially outwardly directed retaining bumps thereon, a cover for disposition at the outer side of the wheel including radially inner and outer portions for respectively overlying the wheel body and the tire rim and connected together by resiliently flexible wire-wheel spoke-simulating elements, said inner cover portion having bump-engaging shoulder means thereon, said spoke-simulating elements having their inner end portions connected to the inner cover member adjacent to said shoulder means and resiliently coacting therewith to exert generally radially inward resilient pressure thereon during cooperation of the shoulder means with the retaining bumps for enhancing the grip of said shoulder means with the retaining bumps.

4. In a cover for disposition at the outer side of a vehicle wheel, an inner crown cover portion having a generally axially inwardly extending side wall flange, a radially outer cover portion radially spaced from said wall flange, connecting wire-wheel-simulating spokes between said cover portions, the axially inner end portion of said wall having a generally radially inwardly directed annular cover-retaining shoulder rib engageable with retaining bumps on a wheel, said shoulder rib having at the axially inner side thereof a generally radially outwardly directed narrow flange with the radially inner ends of the connecting spoke elements extending therefrom.

5. In a cover for disposition at the outer side of a vehicle wheel, an inner crown cover portion having a generally axially inwardly extending side wall flange, a radially outer cover portion radially spaced from said wall flange, connecting spokes between said cover portions, the axially inner end portion of said wall having a generally radially inwardly directed annular cover-retaining shoulder rib engageable with retaining bumps on a wheel, said shoulder rib having at the axially inner side thereof a generally radially outwardly directed narrow flange with the radially inner ends of the connecting spoke elements extending therefrom, said narrow flange having the extremity edge thereof turned generally axially inwardly for engagement against a wheel.

6. In a wheel cover for disposition at the outer side of a vehicle wheel, a sheet metal cover plate having an inner crown portion and a spaced radially outer annular portion with integral spoke-simulating elements connecting the same, and a reinforcing ring member internested in laminated relation behind said annular cover portion and secured thereto and having spoke-simulating elements cooperating with the connecting spoke-simulating elements and having the radially inner ends thereof secured to said crown portion, said reinforcing ring having a generally axially inwardly directed annular pry-off rib thereon adjacent to the radially outer extremity of the laminated assembly.

7. In a cover structure for disposition at the outer side of a vehicle wheel, radially inner and outer spaced cover portions with two sets of crossingly related spoke elements therebetween, one of said sets of spoke elements being resiliently flexible to enable relative axial movement of the cover portions and the other of said sets of spoke elements being fixedly connected to one of said cover portions and having end portions in sliding reciprocable connection with the other of said cover portions.

8. In a wheel structure including a tire rim and a wheel body having retaining bumps thereon, a cover for disposition at the outer side of the wheel including radially inner and outer portions for respectively overlying the wheel body and the tire rim, the inner of said portions having a cover-retaining rib of resiliently flexible structure for retaining engagement with the retaining bumps and with resiliently flexible spoke-simulating elements extending from adjacent to said rib to and connected with the outer of said cover portions, said outer cover portion being generally axially movable as an incident to pry-off force applied thereto for flexing said spoke elements to apply resilient pull on said rib to assist in dislodging the rib from the retaining bumps during pry-off.

9. In a wheel structure including a tire rim and a wheel body having retaining bumps thereon, a cover for disposition at the outer side of the wheel including radially inner and outer portions for respectively overlying the wheel body and the tire rim, the inner of said portions having a cover-retaining rib of resiliently flexible structure for retaining engagement with the retaining bumps and with resiliently flexible spoke-simulating elements extending from adjacent to said rib to and connected with the outer of said cover portions, said outer cover portion being generally axially movable as an incident to pry-off force applied thereto for flexing said spoke elements to apply resilient pull on said rib to assist in dislodging the rib from the retaining bumps during pry-off, and additional spoke elements of substantially rigid structure extending from one of said cover portions into relatively movable relation to the other of said cover portions to enable relative movement therebetween as an incident to said relative axial movement between the cover portions.

10. In a wheel structure including tire rim and body parts with cover retaining generally radially projecting cover retaining bumps on one of said parts, a cover for disposition at the outer side of the wheel including a circular cover portion provided with an annular shoulder for retaining snap-on pry-off engagement with said bumps and a circular cover portion radially spaced from the first mentioned portion and connected thereto by a series of generally radially extending resilient spokes having generally axially inwardly directed edges defining the same for engaging in turn-preventing relation against the wheel behind the cover under substantial resilient compression incident to retaining engagement of said bumps by said cover shoulder.

11. In a wheel structure including a tire rim and a wheel body, a wheel trim member for disposition opposite the tire rim, and means for retaining the trim member in snap-on pry-off relation on the wheel, said trim member at the radially outer portion thereof overlying the tire rim comprising a laminar construction including an outer annular part and an inner annular lamination having an annular hollow generally axially inwardly directed rib overlying the tire rim adjacent to the radially outer extremity of said radially outer trim member portion affording a reinforcing and pry-off shoulder readily accessible to a pry-off tool inserted between said radially outer extremity and the tire rim and with portions of said inner lamination radially inwardly and outwardly from said rib bottomed against the inner face of said outer part.

References Cited in the file of this patent

UNITED STATES PATENTS

| D. 170,231 | Plotkin | Aug. 18, 1953 |
| D. 170,464 | Jenkins | Sept. 22, 1953 |
| 2,020,885 | Gatta | Nov. 12, 1935 |
| 2,601,209 | Lyon | June 17, 1952 |
| 2,676,850 | McLeod | Apr. 27, 1954 |

FOREIGN PATENTS

| 714,587 | France | Nov. 17, 1931 |